United States Patent
Xie et al.

(10) Patent No.: US 10,691,277 B2
(45) Date of Patent: Jun. 23, 2020

(54) TOUCH PANEL, METHOD FOR DRIVING THE SAME, AND DISPLAY DEVICE

(71) Applicants: BOE TECHNOLOGY GROUP CO., LTD., Beijing (CN); Hefei Xinsheng Optoelectronics Technology Co., Ltd., Hefei (CN)

(72) Inventors: Xiaodong Xie, Beijing (CN); Tsung Chieh Kuo, Beijing (CN); Zouming Xu, Beijing (CN); Lei Zhang, Beijing (CN); Jing Wang, Beijing (CN); Yuan Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 52 days.

(21) Appl. No.: 16/072,392

(22) PCT Filed: Jan. 2, 2018

(86) PCT No.: PCT/CN2018/070018
§ 371 (c)(1),
(2) Date: Jul. 24, 2018

(87) PCT Pub. No.: WO2018/223687
PCT Pub. Date: Dec. 13, 2018

(65) Prior Publication Data
US 2020/0019279 A1   Jan. 16, 2020

(30) Foreign Application Priority Data

Jun. 9, 2017 (CN) .......................... 2017 1 0433414

(51) Int. Cl.
*G06F 3/044* (2006.01)
*G06F 3/041* (2006.01)

(52) U.S. Cl.
CPC .......... *G06F 3/0443* (2019.05); *G06F 3/0441* (2019.05); *G06F 3/0448* (2019.05);
(Continued)

(58) Field of Classification Search
CPC ....................................................... G06F 3/044
See application file for complete search history.

(56) References Cited

U.S. PATENT DOCUMENTS 8,872,526 B1 * 10/2014 Hoshtanar ............ G06K 9/0002
324/658
8,878,823 B1 * 11/2014 Kremin ................... G06F 3/044
345/179

(Continued)

FOREIGN PATENT DOCUMENTS

CN        104461190 A      3/2015
CN        104471515 A      3/2015
(Continued)

OTHER PUBLICATIONS

International Search Report for PCT Patent Application No. PCT/CN2018/070018 dated Apr. 8, 2018.

*Primary Examiner* — Lixi C Simpson
(74) *Attorney, Agent, or Firm* — Arent Fox LLP; Michael Fainberg (57) ABSTRACT

Disclosed are a touch panel, a method for driving the same, and a display device, where patterns for performing a touch function are integrated into a transparent touch electrode pattern layer to thereby lower in effect a research and development cost of the product, and the transparent touch electrode pattern layer can be fabricated using only an photomask, so the research and development cost is very low, and the good yield of the product is very high, thus (Continued)

improving the competitiveness of the product. In the transparent touch electrode pattern layer, a plurality of third touch detection electrodes are arranged among touch elements to thereby make up for a blind area of touch between the touch elements, so that both the sensitivity and the uniformity throughout the touch panel can remain constant to thereby support in effect the touch panel with an active pen. Accordingly in an active pen touch detection stage, respective first touch detection electrodes, respective second touch detection electrodes, and respective third touch detection electrodes operate as touch sense electrodes to detect a touch signal transmitted by the active pen.

9 Claims, 5 Drawing Sheets

(52) U.S. Cl.
CPC ...... *G06F 3/04162* (2019.05); *G06F 3/04166* (2019.05); *G06F 2203/04106* (2013.01); *G06F 2203/04107* (2013.01)

(56) References Cited

U.S. PATENT DOCUMENTS

| | | | |
|---|---|---|---|
| 9,495,042 B2* | 11/2016 | Yilmaz | G06F 3/044 |
| 2012/0050211 A1* | 3/2012 | King | G06F 3/0416 |
| | | | 345/174 |
| 2013/0278511 A1* | 10/2013 | Kang | G06F 3/044 |
| | | | 345/173 |
| 2016/0188035 A1* | 6/2016 | Chiou | G06F 3/0416 |
| | | | 345/174 |
| 2017/0123557 A1* | 5/2017 | Na | G06F 3/0412 |
| 2017/0153763 A1* | 6/2017 | Vavra | G06F 3/0488 |

FOREIGN PATENT DOCUMENTS

| | | |
|---|---|---|
| CN | 104750336 A | 7/2015 |
| CN | 104965628 A | 10/2015 |
| CN | 106033290 A | 10/2016 |
| CN | 106354331 A | 1/2017 |
| CN | 107145266 A | 9/2017 |

* cited by examiner

| S601 | Apply a touch scan signal to each of the first touch detection electrodes, detect touch sense signals coupled with each of the second touch detection electrodes, and detect changes in capacitance of each of the third touch detection electrodes, upon determining that a passive touch detection is started |

| S602 | Detect a touch signal, transmitted by an active pen, sensed by each of the first touch detection electrodes, each of the second touch detection electrodes, and each of the third touch detection electrodes, upon determining that an active pen touch detection is started |

TOUCH PANEL, METHOD FOR DRIVING THE SAME, AND DISPLAY DEVICE

This application is a National Stage of International Application No. PCT/CN2018/070018, filed Jan. 2, 2018, which claims the benefit of Chinese Patent Application No. 201710433414.7, filed with the Chinese Patent Office on Jun. 9, 2017, and entitled "A touch panel, a method for driving the same, and a display device", which is hereby incorporated by reference in its entirety.

FIELD

This disclosure relates to the field of display technologies, and particularly to a touch panel, a method for driving the same, and a display device.

BACKGROUND

A touch panel is a system for positioning a touch by calculating the coordinates of the touch on a display screen, and includes a touch detector and a touch controller. The touch detector is installed in front of the display screen, and configured to detect the position of a touch by a user, and to transmit detected information to the controller, and the controller is configured to convert the information into coordinates, and then transmit the coordinates to a central processor, to receive a signal returned by the central processor, and to operate according to the signal, so that the user interacts with the touch panel.

As the touch panel is advancing, there is a demand for higher optical and electrical performance, a more pleasing appearance, and a lower cost thereof. Given a specification of the touch panel, if the cost thereof is lower, then a higher profit will be earned in an intense competition environment. Furthermore as a product carrying an active pen has emerged in the market, it is desirable to enable the touch panel to support the active pen at a low cost.

SUMMARY

In view of this, embodiments of this disclosure provide a touch panel, a method for driving the same, and a display device in the following technical solutions.

An embodiment of this disclosure provides a touch panel including: a base substrate, and a transparent touch electrode pattern layer arranged in single-layer on the base substrate, wherein:

the transparent touch electrode pattern layer includes a plurality of touch elements arranged in an array, and a plurality of third touch detection electrodes arranged among the touch elements;

each of the touch elements includes a first touch detection electrode and a second touch detection electrode which are arranged insulated from each other, a first sensing line connected with the first touch detection electrode, and a second sensing line connected with the second touch detection electrode;

each of the first touch detection electrodes is configured to operate as a touch scan electrode in a passive touch detection stage, and to operate as a touch sense electrode in an active pen touch detection stage;

each of the second touch detection electrodes is configured to operate as the touch sense electrode in both the passive touch detection stage and the active pen touch detection stage; and each of the third touch detection electrodes is configured to operate as a self-capacitive electrode in the passive touch detection stage, and to operate as the touch sense electrode in the active pen touch detection stage.

Optionally, in the touch panel above according to the embodiment of this disclosure, the first touch detection electrodes and the second touch detection electrodes have same areas in the touch elements.

Optionally, in the touch panel above according to the embodiment of this disclosure, shapes of the first touch detection electrodes and shapes of the second touch detection electrodes are centrally symmetric in the touch elements.

Optionally, in the touch panel above according to the embodiment of this disclosure, gaps between the first touch detection electrodes and the second touch detection electrodes are in a shape of a curve in the touch elements.

Optionally, in the touch panel above according to the embodiment of this disclosure, a contour of the touch elements is a rectangle.

Optionally, in the touch panel above according to the embodiment of this disclosure, the first touch detection electrodes and the second touch detection electrodes constitute a Tai Chi pattern in the touch elements.

Optionally, in the touch panel above according to the embodiment of this disclosure, the transparent touch electrode pattern layer further includes supplementary electrodes located around the touch elements, wherein each of the supplementary electrodes is independent of, and a complementary pattern to, the Tai Chi pattern, and a contour of the supplementary electrode is a rectangle.

Optionally, in the touch panel above according to the embodiment of this disclosure, the supplementary electrodes are electrically connected with adjacent first touch detection electrodes, second touch detection electrodes, or third touch detection electrodes.

Optionally, in the touch panel above according to the embodiment of this disclosure, the first sensing lines and the second sensing lines extend in a column direction of the array, and the third touch detection electrodes are arranged at the gaps between every two columns of control elements.

Optionally, in the touch panel above according to the embodiment of this disclosure, the first sensing lines and the second sensing lines extend in a row direction of the array, and the third touch detection electrodes are arranged at the gaps between every two rows of control elements.

Optionally, in the touch panel above according to the embodiment of this disclosure, the transparent touch electrode pattern layer further includes a ground sensing line arranged around the plurality of touch elements.

In another aspect, an embodiment of this disclosure further provides a method for driving the touch panel above, the method including the steps of:

applying a touch scan signal to each of the first touch detection electrodes, detecting touch sense signals coupled, with each of the second touch detection electrodes, and detecting changes in capacitance of each of the third touch detection electrodes, upon determining that a passive touch detection is started; and detecting a touch signal, transmitted by an active pen, sensed by each of the first touch detection electrodes, each of the second touch detection electrodes, and each of the third touch detection electrodes, upon determining that an active pen touch detection is started.

Optionally, in the driving method above according to the embodiment of this disclosure, the method further includes:

determining that the active pen touch detection is started, upon determining that a change of a detected touch sense signal coupled with a second touch detection electrode is above a preset threshold.

In still another aspect, an embodiment of this disclosure provides a display device including: a display panel, and the touch panel above according to the embodiment of this disclosure arranged on a display side of the display panel.

Optionally, in the display device above according to the embodiment of this disclosure, the display panel includes: the display panel includes an opposite substrate and an array substrate arranged opposite thereto;

the touch panel is arranged on a side of the opposite substrate away from the array substrate, and the transparent touch electrode pattern layer of the touch panel is located on a side of the base substrate facing the opposite substrate; and the touch panel further includes a black frame pattern arranged between the base substrate and the transparent touch electrode pattern layer, and a planarization layer arranged on a side of the transparent touch electrode pattern layer away from the black frame pattern.

Optionally, in the display device above according to the embodiment of this disclosure, the display panel includes an opposite substrate and an array substrate arranged opposite thereto;

the touch panel shares the base substrate with the opposite substrate; and the display device further includes a polarizer arranged on the side of the touch panel away from the opposite substrate.

DETAILED DESCRIPTION OF THE EMBODIMENTS

Implementations of a touch panel, a method for driving the same, and a display device according to embodiments of this disclosure will be described below in details with reference to the drawings.

The shapes and sizes of respective components in the drawings are not intended to reflect any real proportion of the touch panel, but only intended to illustrate the disclosure.

Figure 1:
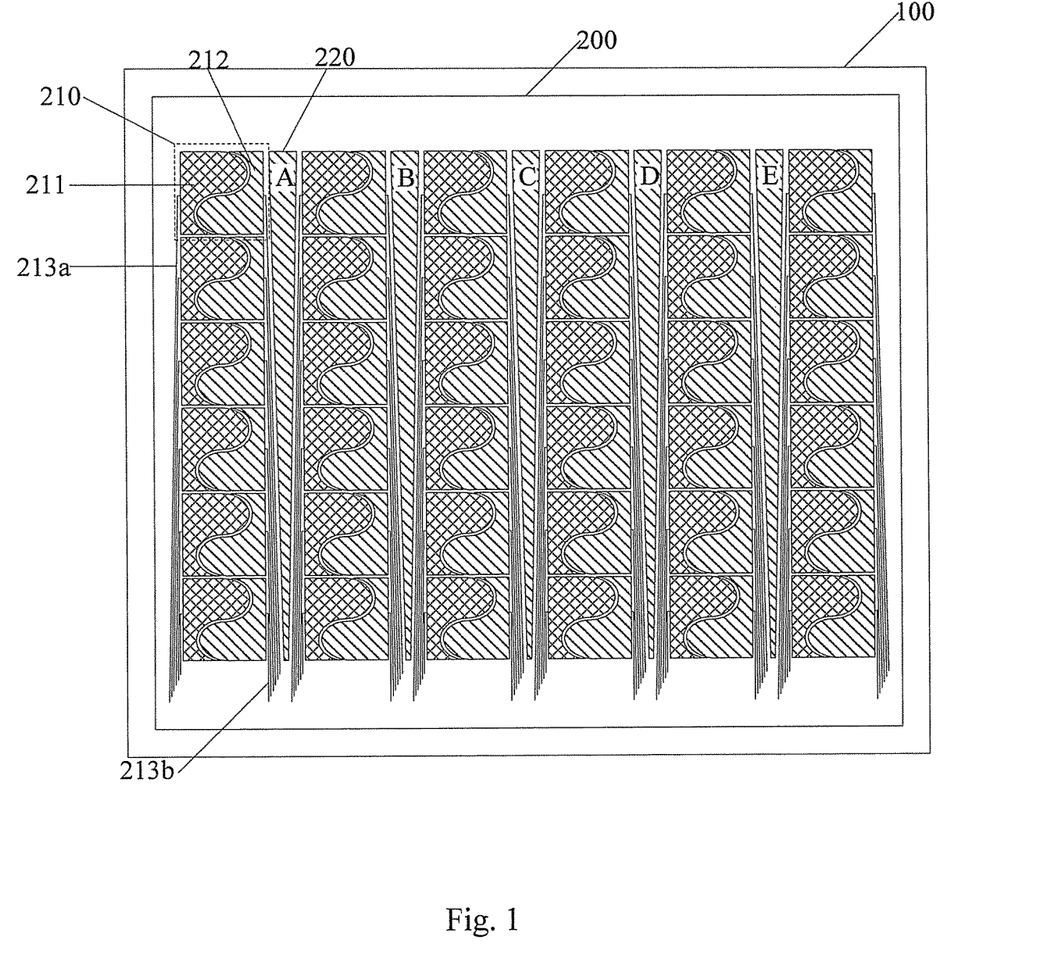
FIG. 1 is a first schematic structural diagram of a touch panel according to an embodiment of this disclosure.
Figure 2:
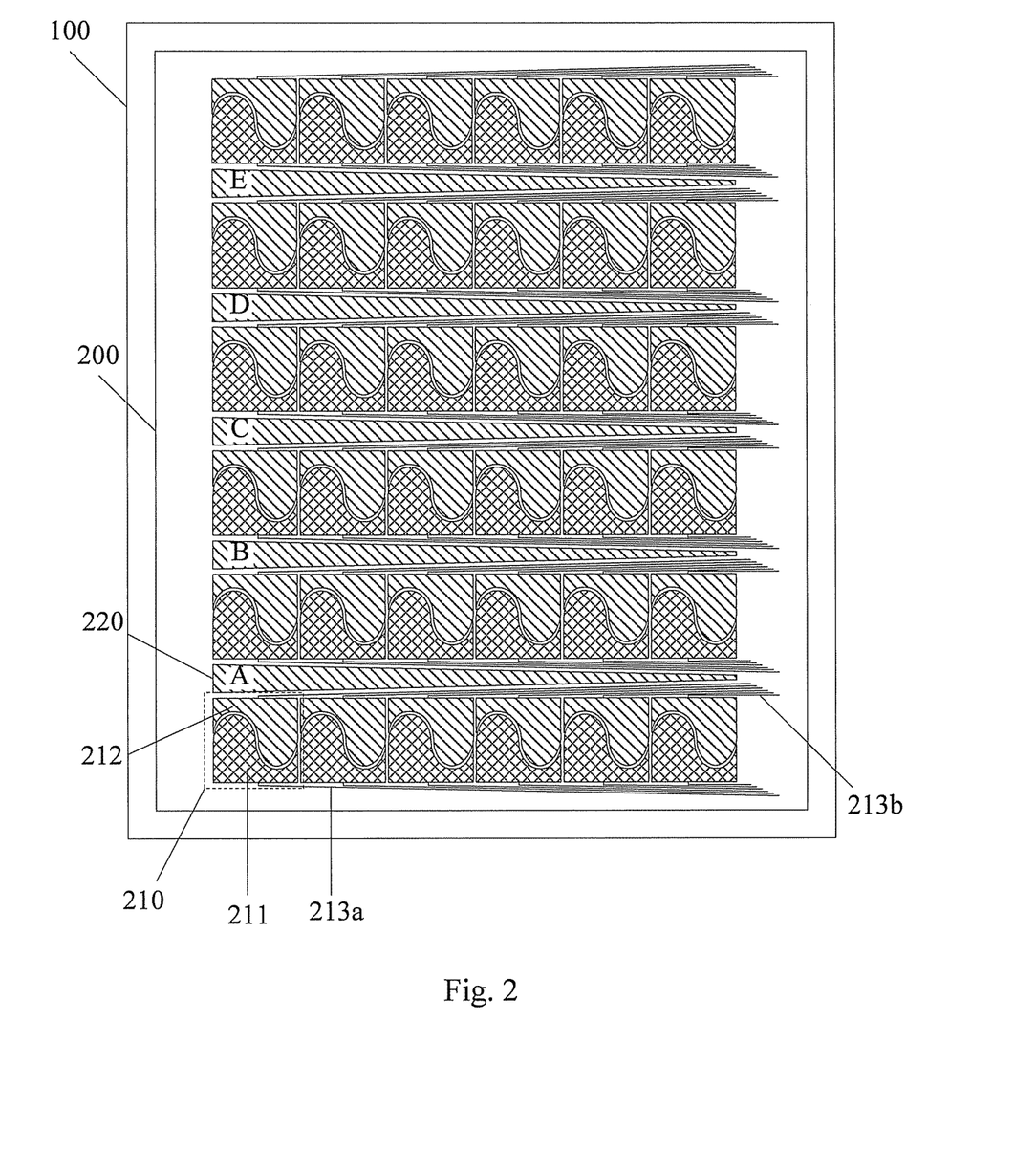
FIG. 2 is a second schematic structural diagram of a touch panel according to an embodiment of this disclosure.

An embodiment of this disclosure provides a touch panel as illustrated in FIG. 1 and FIG. 2, which includes: a base substrate 100, and a transparent touch electrode pattern layer 200 arranged on the base substrate 100.

The transparent touch electrode pattern layer 200 includes a plurality of touch elements 210 arranged in an array, and a plurality of third touch detection electrodes 220 arranged in areas A, B, C, D, E among the touch elements 210.

The respective touch elements 210 include a first touch detection electrode 211 and a second touch detection electrode 212 arranged insulated from each other, a first sensing line 213a connected with the first touch detection electrode 211, and a second sensing line 213b connected with the second touch detection electrode 212.

The respective first touch detection electrodes 211 are configured to operate as touch scan electrodes Tx in a passive touch detection stage, and to operate as touch sense electrodes Rx in an active pen touch detection stage.

The respective second touch detection electrodes 212 are configured to operate as touch sense electrodes Rx in both the passive touch detection stage and the active pen touch detection stage.

The respective third touch detection electrodes 220 are configured to operate as self-capacitive electrodes in the passive touch detection stage, and to operate as touch sense electrodes Rx in the active pen touch detection stage.

Stated otherwise, in the passive touch detection stage, the respective first touch detection electrodes 211 operate as touch scan electrodes Tx, the respective second touch detection electrodes 212 operate as touch sense electrodes Rx, and the first touch detection electrodes 211 and the second touch detection electrodes 212 detect a touch in a mutual capacitance mode; and the respective third touch detection electrodes 220 operate as self-capacitive electrodes, and the third touch detection electrodes 220 detect a touch in a self-capacitance mode.

In the active pen touch detection stage, the respective first touch detection electrodes 211, the respective second touch detection electrodes 212, and the respective third touch detection electrodes 220 operate as touch sense electrodes Rx to detect a touch signal transmitted by an active pen.

Optionally, in the touch panel above according to the embodiment of this disclosure, patterns for performing a touch function are integrated into the transparent touch electrode pattern layer 200 to thereby lower in effect a research and development cost of the product, and the transparent touch electrode pattern layer 200 can be fabricated using only a photomask, so the research and development cost is very low, and the good yield of the product is very high, thus improving the competitiveness of the product.

Furthermore in the transparent touch electrode pattern layer 200, the plurality of third touch detection electrodes 220 are arranged in areas A, B, C, D, E between the touch elements 210 to thereby make up for a blind area of touch between the touch elements 210, so that both the sensitivity and the uniformity throughout the touch panel can remain constant to thereby support in effect the touch panel with an active pen. Optionally, in the passive, i.e., finger, touch detection stage, the first touch detection electrodes 211 and the second touch detection electrodes 212 in the touch elements 210 detect a touch in the mutual-capacitance mode, and the third touch detection electrodes 220 detect a touch in the self-capacitance mode; and in the active pen touch detection stage, the respective first touch detection electrodes 211, the respective second touch detection electrodes 212, and the respective third touch detection electrodes 220 operate as touch sense electrodes Rx to detect a touch signal transmitted by the active pen.

Optionally, in the touch panel above according to the embodiment of this disclosure, in order to facilitate arrangement of the transparent touch electrode pattern layer 200 in a single layer, as illustrated in FIG. 1 and FIG. 2, the first sensing lines 213a and the second sensing lines 213b are typically arranged to extend in the same direction, so that one terminals of the sensing lines are bound with an externally connected touch detection chip as connection terminals.

Optionally, in the touch panel above according to the embodiment of this disclosure, as illustrated in FIG. 1, the first sensing lines 213a and the second sensing lines 213b can extend in the column direction, that is, they are arranged in the vertical direction, and at this time, the first sensing lines 213a and the second sensing lines 213b are distributed so densely between adjacent columns of touch elements 210 that signals may interfere with each other, thus resulting in a blind area of touch in which a touch finger fails to be recognized; and at this time, the third touch detection electrodes 220 can be arranged at gaps between every two adjacent columns of touch elements 210, and the third touch detection electrodes 220 can be strip electrodes, so that the third touch detection electrodes 220 can be bounded with the externally connected touch detection chip through shorter third sensing lines with one terminals thereof being connection terminals.

Optionally, in the touch panel above according to the embodiment of this disclosure, as illustrated in FIG. 2, the first sensing lines 213a and the second sensing lines 213b can extend in the row direction, that is, they are arranged in the horizontal direction, and at this time, the first sensing lines 213a and the second sensing lines 213b are distributed so densely between adjacent rows of touch elements 210 that signals may interfere with each other, thus resulting in a blind area of touch in which a touch finger fails to be recognized; and at this time, the third touch detection electrodes 220 can be arranged particularly at gaps between every two adjacent rows of touch elements 210, and particularly the third touch detection electrodes 220 can be strip electrodes, so that the third touch detection electrodes 220 can be bounded with the externally connected touch detection chip through shorter third sensing lines with one terminals thereof being connection terminals.

Optionally, in the touch panel above according to the embodiment of this disclosure, as illustrated in FIG. 1 and FIG. 2, in order to improve the uniformity of detecting a touch, the first touch detection electrodes 211 and the second touch detection electrodes 212 have the same areas in the touch elements 210.

Optionally, in the touch panel above according to the embodiment of this disclosure, as illustrated in FIG. 1 and FIG. 2, the shapes of the first touch detection electrodes 211, and the shapes of the second touch detection electrodes 212 are centrally symmetric in the touch elements 210.

Optionally, in the touch panel above according to the embodiment of this disclosure, as illustrated in FIG. 2, in order to improve the sensitivity of detecting a touch, the gaps between the first touch detection electrodes 211 and the second touch detection electrodes 212 can be set in the shape of a curve in the touch elements 210.

Figure 3:
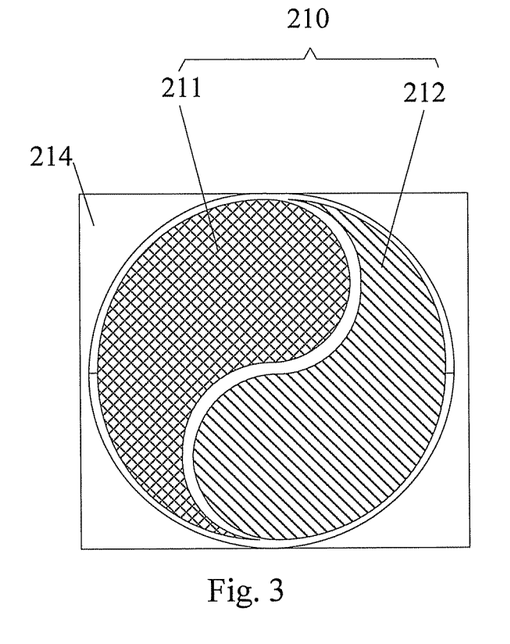
FIG. 3 is a first schematic diagram of a touch element in a touch panel according to an embodiment of this disclosure.
Figure 4:
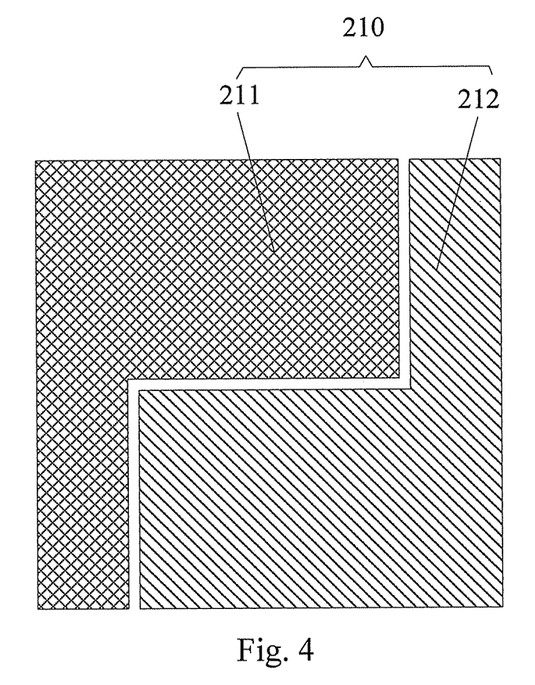
FIG. 4 is a second schematic diagram of a touch element in a touch panel according to an embodiment of this disclosure.

As illustrated in FIG. 3, the gaps between the first touch detection electrodes 211 and the second touch detection electrodes 212 can be in the shape of an arc, or as illustrated in FIG. 4, the gaps between the first touch detection electrodes 211 and the second touch detection electrodes 212 can be in the shape of a zigzag, although the embodiment of this disclosure will not be limited thereto.

Optionally, in the touch panel above according to the embodiment of this disclosure, in order to facilitate the arrangement, as illustrated in FIG. 1, FIG. 2, and FIG. 4, the contours of the touch elements 210 are typically a rectangle, and for example, can be a square.

Optionally, in the touch panel above according to the embodiment of this disclosure, as illustrated in FIG. 3, the first touch detection electrodes 211 and the second touch detection electrodes 212 can constitute a Tai Chi pattern in the touch elements 210 to thereby improve the ratio of the area of a first touch detection electrode 211 to the area of a second touch detection electrode 212 in a touch element 210 so as to improve a change in mutual capacitance arising from sensing by the second touch detection electrode 212 as many as possible, thus improving the sensitivity to a touch sensed in the mutual-capacitance mode.

Figure 5:
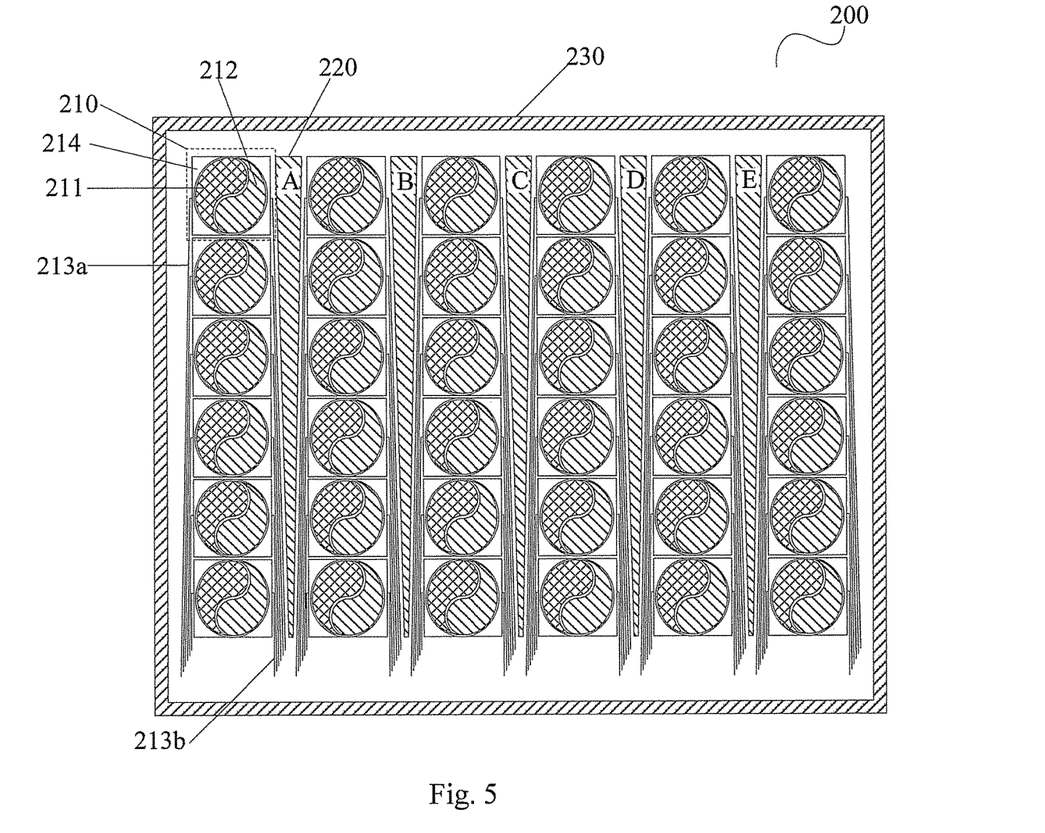
FIG. 5 is a schematic structural diagram of a transparent touch electrode pattern layer in a touch panel according to an embodiment of this disclosure.

Optionally, in the touch panel above according to the embodiment of this disclosure, when the first touch detection electrodes 211 and the second touch detection electrodes 212 are arranged in the Tai Chi pattern, in order to avoid a significant part of the pattern from becoming absent between the touch elements 210 in the Tai Chi pattern with a round contour, which would otherwise result in the problem of invisibility in the product, i.e., a visible pattern, as illustrated in FIG. 3 and FIG. 5, the transparent touch electrode pattern layer 200 can further include supplementary electrodes 214 located around the respective touch elements 210, where each supplementary electrode 214 is independent of, and a complementary pattern to, the Tai Chi pattern, and the contour of the supplementary electrode 214 is a rectangle, thus avoiding a significant part of the pattern from becoming absent in the touch element 210.

Furthermore in order to narrow a blind area of touch in the transparent touch electrode pattern layer 200 as many as possible, in the touch panel above according to the embodiment of this disclosure, the supplementary electrodes 214 can be electrically connected with the adjacent first touch detection electrodes 211, second touch detection electrodes 212, or third touch detection electrodes 213 so that the supplementary electrodes 214 are parts of the electrodes connected therewith, and operate in the same way as the electrodes. Furthermore the supplementary electrodes 214 are independent of the Tai Chi patterns and the third touch detection electrodes 213, so optionally the supplementary electrodes 214 can be connected with the other electrodes by setting connection wires. As illustrated in FIG. 3, for example, the left halves of the supplementary electrodes 214 can be connected with the first touch detection electrodes 211 through connection wires, and correspondingly the right halves of the supplementary electrodes 214 can be connected with the second touch detection electrodes 212 through connection wires; and in order to avoid the first touch detection electrodes 211 from being short-circuited with the second touch detection electrodes 212, the left halves of the supplementary electrodes 214, and the right halves of the supplementary electrodes 214 are insulated from each other.

Optionally, in the touch panel above according to the embodiment of this disclosure, the transparent touch electrode pattern layer 200 is only arranged in a single layer to thereby arrange touch electrodes, so in order to prevent electrostatic interference, as illustrated in FIG. 5, the transparent touch electrode pattern layer 200 can further include a ground sensing line 230 arranged on the periphery thereof, that is, the ground sensing line 230 is arranged to surround the touch elements 210 and the third touch detection electrodes 220. The ground sensing line 230 can be arranged to prevent electrostatic charges to thereby protect the surrounded electrode pattern from electrostatic interference.

Based upon the same inventive idea, an embodiment of this disclosure further provides a method for driving the touch panel above according to the embodiment of this disclosure, and since the driving method addresses the problem under a similar principle to the touch panel above, reference can be made to an implementation of the touch panel for an implementation of the driving method, and a repeated description thereof will be omitted here.

Figure 6:
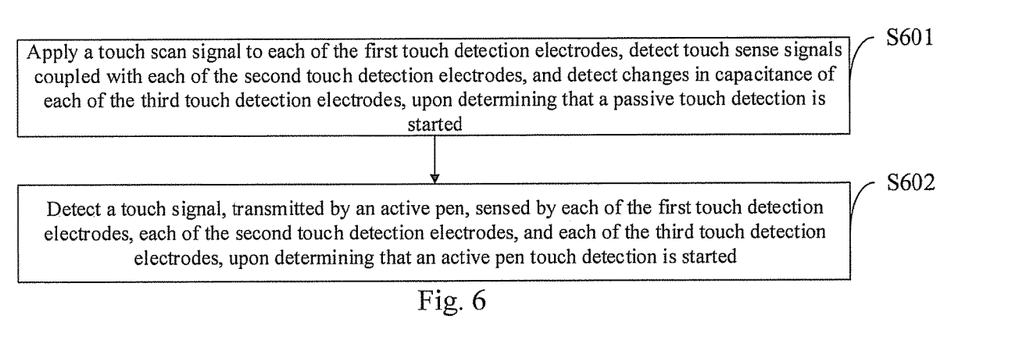
FIG. 6 is a flow chart of a method for driving a touch panel according to an embodiment of this disclosure.

Optionally, an embodiment of this disclosure provides a method for driving a touch panel as illustrated in FIG. 6, where the method includes the following steps.

S601: applying a touch scan signal to the respective first touch detection electrodes, detecting touch sense signals coupled with the respective second touch detection electrodes, and detecting changes in capacitance of the respective third touch detection electrodes, upon determining that passive touch detection is started.

S602: detecting a touch signal, transmitted by an active pen, sensed by the respective first touch detection electrodes, the respective second touch detection electrodes, and the respective third touch detection electrodes, upon determining that active pen touch detection is started.

Optionally, in the method above for driving a touch panel according to the embodiment of this disclosure, the method can further include the step of determining switching between a passive touch detection mode and an active pen touch detection mode, where it is determined that active pen touch detection is started, upon determining that a change of a detected touch sense signal coupled with a second touch detection electrode is above a preset threshold.

Stated otherwise, in the step of detecting passive touch detection, if the active pen is approaching the touch panel, the touch sense signal coupled with the second touch detection electrode significantly changes, so the change of the touch sense signal coupled with the second touch detection electrode is compared with the preset threshold, so that it can be determined whether the active pen is approaching the touch panel; and if so, then the touch panel will be switched to the active pen touch detection mode, that is, the respective first touch detection electrodes, the respective second touch detection electrodes, and the respective third touch detection electrodes operate as touch sense electrodes, and a touch signal, transmitted by the active pen, sensed by the respective first touch detection electrodes, the respective second touch detection electrodes, and the respective third touch detection electrodes is detected to thereby detect the position of a touch; otherwise, passive touch detection will be maintained, that is, a touch scan signal is applied to the respective first touch detection electrodes, touch scan signals sensed by the respective second touch detection electrodes are detected, and changes in capacitances of the respective third touch detection electrodes are detected, to thereby detect the position of a touch.

Based upon the same inventive idea, an embodiment of this disclosure further provides a display device, which can be a mobile phone, a tablet computer, a TV set, a monitor, a notebook computer, a digital photo frame, a navigator, or any other product or component with a display function. Reference can be made to the embodiment of the touch panel for an implementation of the display device, and a repeated description thereof will be omitted here.

Figure 7A:
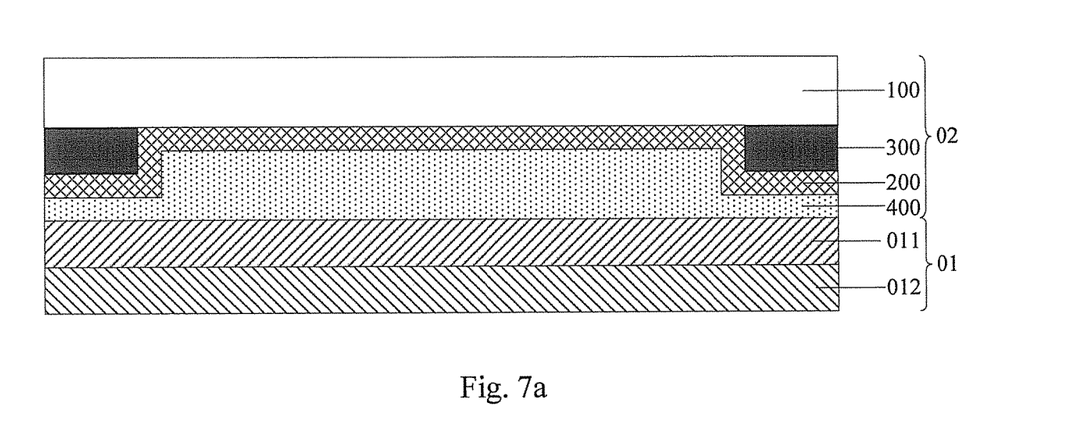
FIG. 7A and FIG. 7B are schematic structural diagrams respectively of a display device according to an embodiment of this disclosure.
Figure 7B:
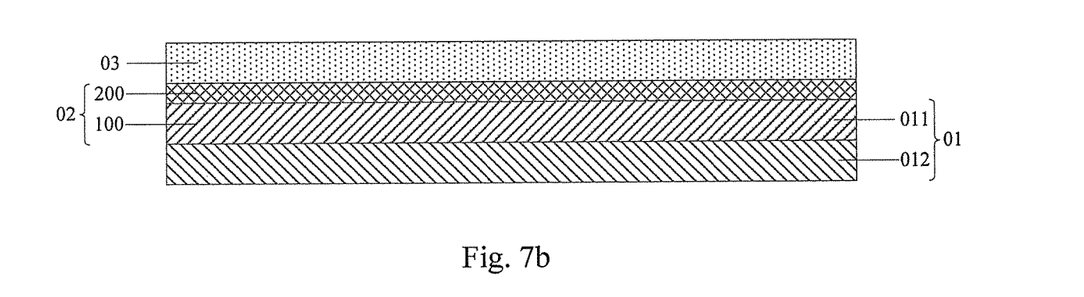

Optionally, an embodiment of this disclosure provides a display device as illustrated in FIG. 7A and FIG. 7B, where the display device includes a display panel 01, and the touch panel 02 above according to the embodiment of this disclosure arranged on a display side of the display panel 01.

Optionally, the display panel 01 in the display device above according to the embodiment of this disclosure can be embodied in a number of implementations, e.g., a liquid crystal display panel, an organic light-emitting display panel, or another flat display panel. Optionally, as illustrated in FIG. 7A, generally the display panel 01 includes an opposite substrate 011 and an array substrate 012 arranged opposite thereto, where the display side is generally a side of the opposite substrate 011.

Optionally, the touch panel 02 in the display device above according to the embodiment of this disclosure can be arranged on-cell, that is, as illustrated in FIG. 7A, the touch panel 02 is arranged on the side of the opposite substrate 011 away from the array substrate 012, and the transparent touch electrode pattern layer 200 of the touch panel 02 is located on the side of the base substrate 100 facing the opposite substrate 011; and at this time, the touch panel 02 generally can further include a black frame pattern 300 arranged between the base substrate 100 and the transparent touch electrode pattern layer 200, and a planarization layer 400 arranged on the side of the transparent touch electrode pattern layer 200 away from the black frame pattern 300. The planarization layer 400 is generally made of an Optical Clear Resin (OCR). The base substrate 100 supporting the touch panel 02 further protects it.

Optionally, the touch panel 02 in the display device above according to the embodiment of this disclosure can alternatively be structured on the opposite substrate, that is, as illustrated in FIG. 7B, the touch panel 02 shares the base substrate 100 with the opposite substrate 011; and at this time, the display device generally can further include a polarizer 03 arranged on the side of the touch panel 02 away from the opposite substrate 011, where the polarizer 03 has a reflect function to block ambient light, thereby guarantee contrast required for the display device.

In the touch panel, the method for driving the same, and the display device above according to the embodiments of this disclosure, patterns for performing a touch function are integrated into the transparent touch electrode pattern layer to thereby lower in effect a research and development cost of the product, and the transparent touch electrode pattern layer can be fabricated using only an photomask, so the research and development cost is very low, and the good yield of the product is very high, thus improving the competitiveness of the product. In the transparent touch electrode pattern layer, the plurality of third touch detection electrodes are arranged between the touch elements to thereby make up for a blind area of touch between the touch elements, so that both the sensitivity and the uniformity throughout the touch panel can remain constant to thereby support in effect the touch panel with an active pen. Particularly in the passive, i.e., finger, touch detection stage, the first touch detection electrodes and the second touch detection electrodes in the touch elements detect a touch in the mutual-capacitance mode, and the third touch detection electrodes detect a touch in the self-capacitance mode; and in the active pen touch detection stage, the respective first touch detection electrodes, the respective second touch detection electrodes, and the respective third touch detection electrodes operate as touch sense electrodes to detect a touch signal transmitted by the active pen.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A touch panel, comprising: a base substrate, and a transparent touch electrode pattern layer arranged in single-layer on the base substrate, wherein:
   the transparent touch electrode pattern layer comprises a plurality of touch elements arranged in an array, and a plurality of third touch detection electrodes arranged among the touch elements;
   each of the touch elements comprises a first touch detection electrode and a second touch detection electrode which are arranged insulated from each other, a first sensing line connected with the first touch detection electrode, and a second sensing line connected with the second touch detection electrode;
   each of the first touch detection electrodes is configured to operate as a touch scan electrode in a passive touch detection stage, and to operate as a touch sense electrode in an active pen touch detection stage;
   each of the second touch detection electrodes is configured to operate as the touch sense electrode in both the passive touch detection stage and the active pen touch detection stage; and
   each of the third touch detection electrodes is configured to operate as a self-capacitive electrode in the passive touch detection stage, and to operate as the touch sense electrode in the active pen touch detection stage;
   wherein the first touch detection electrodes and the second touch detection electrodes have same areas in the touch elements;
   shapes of the first touch detection electrodes and shapes of the second touch detection electrodes are centrally symmetric in the touch elements;
   gaps between the first touch detection electrodes and the second touch detection electrodes are in a shape of a curve in the touch elements;
   the first touch detection electrodes and the second touch detection electrodes constitute a Tai Chi pattern in the touch elements; and
   the transparent touch electrode pattern layer further comprises supplementary electrodes located around the touch elements, wherein each of the supplementary electrode is independent of, and a complementary pattern to, the Tai Chi pattern, and a contour of the supplementary electrodes is rectangle.

2. The touch panel according to claim 1, wherein a contour of the touch elements is a rectangle.

3. The touch panel according to claim 1, wherein the supplementary electrodes are electrically connected with adjacent first touch detection electrodes, second touch detection electrodes, or third touch detection electrodes.

4. The touch panel according to claim 1, wherein the first sensing lines and the second sensing lines extend in a column direction of the array, and the third touch detection electrodes are arranged at gaps between every two columns of touch elements.

5. The touch panel according to claim 1, wherein the first sensing lines and the second sensing lines extend in a row direction of the array, and the third touch detection electrodes are arranged at the gaps between every two rows of control elements.

6. The touch panel according to claim 1, wherein the transparent touch electrode pattern layer further comprises a ground sensing line arranged around the plurality of touch elements.

7. A display device, comprising: a display panel, and the touch panel according to claim 1 arranged on a display side of the display panel.

8. The display device according to claim 7, wherein the display panel comprises an opposite substrate and an array substrate arranged opposite thereto;
   the touch panel is arranged on a side of the opposite substrate away from the array substrate, and the transparent touch electrode pattern layer of the touch panel is located on a side of the base substrate facing the opposite substrate; and
   the touch panel further comprises a black frame pattern arranged between the base substrate and the transparent touch electrode pattern layer, and a planarization layer arranged on a side of the transparent touch electrode pattern layer away from the black frame pattern.

9. The display device according to claim 7, wherein the display panel comprises an opposite substrate and an array substrate arranged opposite thereto;
    the touch panel shares the base substrate with the opposite substrate; and
    the display device further comprises a polarizer arranged on a side of the touch panel away from the opposite substrate.

* * * * *